Patented Nov. 19, 1935

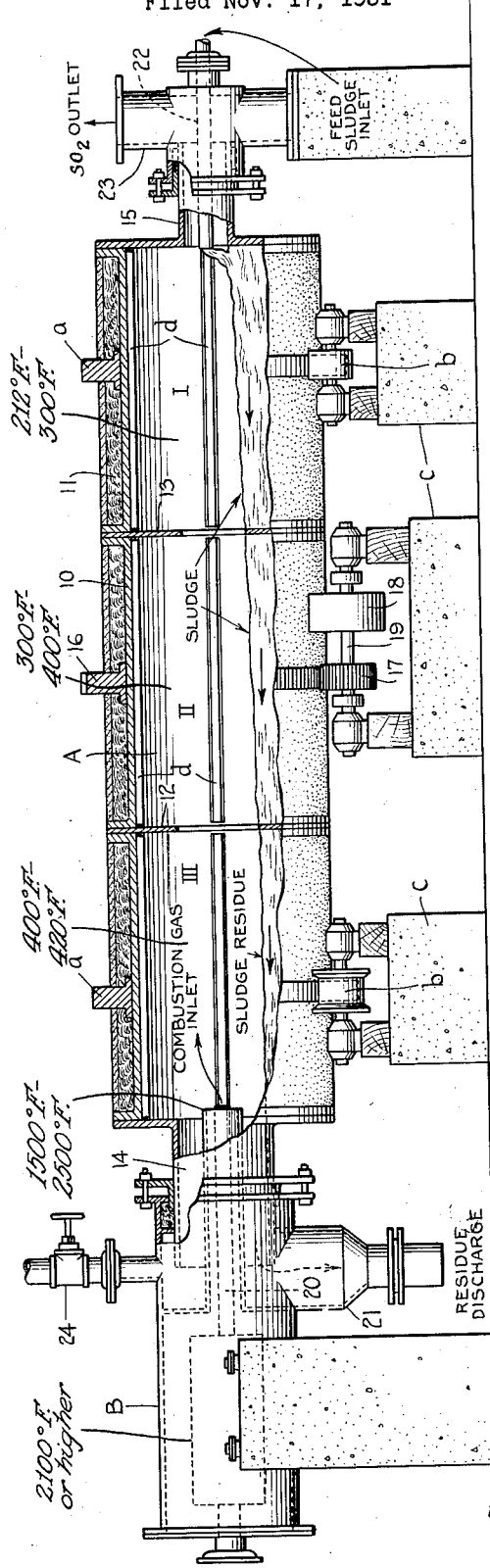

2,021,725

UNITED STATES PATENT OFFICE 2,021,725

MANUFACTURE OF $SO_2$ GAS

Ingenuin Hechenbleikner, Charlotte, N. C., assignor to Chemical Construction Corporation, Charlotte, N. C., a corporation of Delaware Application November 17, 1931, Serial No. 575,550

7 Claims. (Cl. 23—177)

This invention relates to the manufacture of sulphurous acid gas, and has special reference to the provision of an improved process for producing sulphur dioxide gas of high strength and substantially free from impurities.

The prime object of my present invention centers about the provision of an improved process for generating or liberating $SO_2$ gas from bodies containing sulphur compounds, the $SO_2$ gas produced being substantially free from $SO_3$ and sulphuric acid vapors as well as from other solid or vapor impurities.

In my copending application Serial No. 568,050, filed Oct. 10, 1931, now Patent No. 1,953,225, dated April 3, 1934, to improvements in the "Treatment of acid sludge", there is set forth a method of producing $SO_2$ gas of relatively high concentration and substantially free from either solid or vapor impurities from acid sludge obtained in the refining of petroleum, tar or other organic materials. In the method there described, the produced gas consists of $SO_2$ substantially free from tarry vapors, $H_2S$ gas, $SO_3$, S, and sulphuric acid vapors and containing only water in the form of steam and a minimum amount of light hydrocarbons which may be removed with little difficulty. The present application is a continuation in part of said copending application, the invention herein being directed to improvements in the method of obtaining the $SO_2$ gas whereby there is generated a resulting $SO_2$ gas product which is increased in strength, and which is more substantially free from any $CO_2$ forming part of the combustion gases of the process and wherein economies in the use of fuel for the process are effected.

To the accomplishment of these objects and such other objects as will hereinafter appear, my invention consists in the processes and the steps of the processes hereinafter more particularly described and sought to be defined in the claims, reference being had to the accompanying drawing which shows a front elevational view of the apparatus used in the practice of the present process, with parts broken away to show the interior subdivision of a part of the apparatus.

In the process set forth in my aforesaid copending application Serial No. 568,050, now Patent No. 1,953,225, dated April 3, 1934, acid sludge obtained in the refining of petroleum, etc., is subjected in a retort A to the action of heat so that the organic matter of the sludge is made to react upon the sulphuric acid or its compounds in the sludge to convert the same to gases, which are removable from the sphere of reaction. The heat is preferably obtained by combustion gases generated in a furnace B; and the sludge in the retort A is directly heated with these combustion gases. By the reaction in the retort, the sulphuric acid and its compounds in the sludge are reduced to $SO_2$ gas; and in the practice of the process, the reacting constituents and the reaction conditions are so controlled as to generate $SO_2$ gas without producing such side reactions as result in the cracking or distillation of the heavy hydrocarbons, the destructive distillation of the carbonaceous residue, the distillation of sulphur, $SO_3$ or sulphuric acid, the formation of dust, the generation of carbon monoxide or carbon dioxide gases, or the ultimate formation or inclusion with the removed $SO_2$ gas of $H_2S$ gas, the reaction being moreover so carried out as to limit the formation to the minimum amount of the lighter hydrocarbons by distillation. There results therefore, in addition to the production or recovery of an $SO_2$ product substantially free of impurities, the production of a granular sludge residue in the form of a very desirable fuel of an acid-free character having a high volatile content. The $SO_2$ gas is produced in such a condition that it may be readily and efficiently converted in contact or catalytic apparatus to sulphuric anhydride and sulphuric acid.

The combustion gases employed in the furnace B may be obtained from a variety of sources, and may be produced, for example, from the burning of natural gas, oil, powdered coal, coke or other heat producing materials. In the retort or gas generator A, the reduction of the sulphuric acid or its compounds is, as I have found, brought about by hydrogen, which explains the absence of carbon dioxide gas in the gases produced in the retort A. The combustion gases produced in the furnace B, however, are not wholly free from $CO_2$ gas when natural gas or oil or powdered coal, etc. is used to produce the combustion gases. I have found that if sulphur or a sulphur compound be employed in the combustion furnace as fuel, either alone or mixed with other fuels, the strength and purity of the $SO_2$ gas finally produced are increased by the direct addition of the $SO_2$ produced by the burning of the sulphur or the sulphur compound and by the elimination of the $CO_2$ gas that would have been produced by the burning of other fuel. I have found particularly that sulphur or $H_2S$ gas may be burned in the furnace or mixed with a fuel therein to produce the desired results. Other sulphur containing compounds such as pyrites may also be employed. The use of either $H_2S$ or sulphur as fuel, alone or mixed with other fuels, also reduces the cost of treating the sludge since the H₂S gas may be obtained from refinery gases. I have furthermore discovered that either sulphur or H₂S gas may be burned in the furnace without generating SO₃, it being desirable, however, to maintain the temperature of the gases in the furnace above 2100° F. Thus not only am I enabled to produce SO₂ gas in the retort or gas generator A substantially without the formation of SO₃, but I am enabled also to produce SO₂ gas at higher temperatures in the furnace without the formation of SO₃, this being a desideratum of great importance where the SO₂ gas is to be used in the contact method of producing sulphuric acid.

While the process of the invention herein is shown applied to the treatment of acid sludge and to the production or recovery therefrom of SO₂, it will be understood that the present process may be applied to the liberation of SO₂ from other bodies. For example, the heat of combustion of the combustion gases may be applied to liberate SO₂ from any other substance such as an aqueous solution of SO₂ or silica gel which contains SO₂ by adsorption. The combustion gases may obviously be either directly or indirectly applied to the SO₂ containing body to heat the same to the temperature where the SO₂ is liberated. The combustion gases containing SO₂ and the liberated SO₂ gas may be co-mingled in any part of the apparatus to produce the purified and strengthened SO₂ product.

As set forth in my said copending application Serial No. 568,050, now Patent No. 1,953,225, dated April 3, 1934 the process steps of the present invention may be suitably practiced in a retort apparatus such as shown in the drawing, wherein a body of the petroleum or acid sludge is directly heated by the hot combustion gases in an elongated drum-shaped retort A, the combustion gases generated in the furnace B being injected under suitable pressure into the drum retort A. The retort A preferably comprises a cylinder or drum generally designated as 10 made of iron or steel which if desired may be outwardly covered with a heat insulating material 11, which in turn may be encased in a cement or metal casing, as shown. The drum 10 is preferably interiorly subdivided by means of annular members such as 12 and 13 into a plurality of separate and intercommunicating compartments, three of which are exemplified in the figure of the drawing and designated as I, II and III. The drum retort 10 is provided at its opposite ends with reduced cylinder sections 14 and 15 respectively which serve for the ingress and egress of the reacting constituents and resulting products.

In the preferred practice of the process, the sludge charge in the retort 10 is caused to flow through the compartments I, II and III in seriatim and is thoroughly and continuously agitated as it moves through the compartments so that all parts of the charge are progressively reacted and acted upon by the heating medium. To accomplish these ends the drum retort is preferably mounted for rotation during operation, the drum being provided for this purpose with a gear 16 which is rotated by meshing engagement with a gear 17, bearing for rotation of the drum being provided by the supporting engagement of flanges $a$, $a$ suitably spaced along the drum with grooved and other rollers $b$, $b$ appropriately journalled in concrete spaced standards $c$, $c$ forming the main bed of the retort apparatus. The gear 17 derives power from an external source transmitted to a pulley such as 18 fixed on the gear shaft 19. As the drum A is rotated, the sludge charge therein is agitated and moves from one compartment into the next at a controlled or predetermined speed. Preferably the charge is more thoroughly agitated or "kneaded" by providing flights $d$, $d$ interiorly of the compartments (which elevate and drop the sludge mass during retort rotation) and by introducing iron rods or rails in the compartments which are in turn elevated by the flights and which drop onto the sludge body, acting to break up and pound the viscous and heavy sludge and carbonaceous residue as these are caused to flow through the compartments, and serving to prevent the same from caking, adhering to and building up on the walls of the retort and to facilitate the thorough and uniform treatment of the sludge body.

The construction and design of the retort apparatus may be varied within substantial limits, depending upon a number of factors and mainly upon the capacity of the plant. For a small plant (2 sludge ton daily capacity) the retort 10 may for example have an inside length of 8 to 10 feet, and an inside diameter of 2 feet. Such a retort may be subdivided into two or three separate compartments of equal dimensions. When subdivided into two compartments a single annular member is used. The internal diameter of the cylindrical end section 14 may be one foot; the diameter of the orifice of the annular member may be 12 to 10 inches; and the internal diameter of the cylindrical end section 15 may be 6 inches, these diameters being thus arranged in progressively decreasing and stepped relationship. The rotational speed imparted to the retort 10 may be of the order of 16 R. P. M. Two flights are preferably provided in each compartment parallel to the walls of the retort 10 and iron rails may also be provided in each compartment for the purpose aforedescribed. Such an apparatus has been successfully employed with combustion gases having an oxygen content of from 2 to 6% and liquid sludges have been treated therein, having approximately the following analysis: 53.3% H₂SO₄ by titration, 18.8% water, approximately 4% of volatile oils, and the balance heavy hydrocarbon compounds. The temperatures of the entering combustion gases of such a unit are preferably from 1500° to 2500° F. I have found it to be preferred, however, to keep the temperature of the gases above 2100° F. in the burning of sulphur or H₂S, since by doing so I have found that the formation of SO₃ is substantially completely obviated.

As an example of a suitable retort construction having a larger capacity such as a 50 sludge ton capacity, the retort 10 (made of cast iron or steel) may have a length of about 35 feet and an inside diameter of 4½ feet; the compartments I, II and III thereof may be of equal dimensions with the opening of the annular member 13 about 20 inches and the opening of the annular member 12 about 24 inches, the internal diameters of the cylindrical end sections 14 and 15 being respectively 30 inches and 12 inches. It will be noted here also that the diameters or sizes of the openings of the spaced elements 15, 13, 12 and 14 progressively increase in size, this facilitating the controlled flow of the sludge body and sludge residue to, through and from the retort chambers. If desired, the retort 10 may be also slightly inclined so as to further induce the flow of the sludge and residue through the retort. This flow, however, may be most desirably controlled by predetermining the orifice diameters of the elements 12—15 and by controlling the rotational speed of the retort. The rotational speed of such a unit may be 10 R. P. M.

I have found that the aforesaid desired results of the present process may be attained by controlling the heat treatment of the sludge body and residue in the retort within given temperature ranges and under definite speed and reacting conditions. I have empirically ascertained that this may be most suitably governed and readily controlled by flowing the heated gases over the agitated sludge body in the retort, the heated gases being introduced at one end of the retort, and by flowing feed sludge into the sludge body at the other end of the retort, the heated gases and the sludge body being thus brought into contact with each other by movement in generally countercurrent directions. The produced reaction gases are preferably withdrawn or expelled from the retort at the feed sludge intake end thereof and the solid residue of the sludge is preferably withdrawn or removed from the retort at the combustion gas intake end thereof, the combustion and reaction gases being therefore caused to flow through the retort in generally co-current directions.

The cylindrical end section 14 of the retort is therefore made to serve as the intake or entrant end for the combustion gases and the expulsion end for the carbonaceous residue, while the opposite cylindrical end section 15 of the retort is made to serve as the intake or entrant point for the feed sludge and as the exit or expulsion end for the $SO_2$ gas. The section 14 therefore is made to receive the nozzle 20 of the combustion apparatus B and is made to communicate with a hopper 21 for the discharge of the carbonaceous residue, which hopper is sealed at the bottom by means of a slide door or the like. The section 15 is in turn made to receive the feed sludge pipe 22 and is made to communicate with the gas outlet 23. Since the retort chamber 10 is rotatable, the joints between the retort A and the combustion apparatus B at one end and those between the retort and the gas outlet 23 at the other end are suitably packed with some stuffing material such as asbestos or the like, as clearly shown in the drawing. It is highly desirable to make these joints air tight so as to prevent the ingress of atmospheric air into the retort at either end or the loss of gases from the retort.

In the operation of the apparatus thus far described, a relatively weak feed sludge is introduced into the retort through the pipe 22 and into the body of sludge under treatment therein, which sludge body is thoroughly agitated and "kneaded" as it is rotationally moved with the retort and as the sludge body is progressively moved through the retort compartments I, II and III to the residue discharge end 14 of the retort. Hot combustion gases generated in the combustion apparatus B are introduced through the nozzle 20 into the retort and are caused to flow in the opposing direction through the retort chambers for bringing and maintaining the sludge and residue in the retort up to and at the desired temperatures. The reaction gases are caused or induced to flow through the chambers in the direction of combustion gas flow and out through the gas outlet pipe 23.

By means of the apparatus and the operation described, I am enabled to carry out the heat treatment of the sludge uniformly in defined and graduated temperature zones, which zones may be generally said to correspond with the retort compartments I, II and III. While I prefer to subdivide the retort into the separate compartments, it will be understood that an actual subdivision in the separate compartments is not essential. The combustion gas flow and the flow of the feed sludge are controlled so as to create the three zones of reaction. In the reaction zone generally defined by compartment I, evaporation of the water content of the sludge as well as the distillation of the lighter hydrocarbons takes place; and here there is produced a sulphuric acid of high concentration brought to the point at which the acid will react on the organic matter therein. In the reaction zone generally defined by compartment II, the main reaction takes place; and this reaction is carried out within a range of temperatures below that at which $SO_3$ is distilled off and at a rate at which the generation of $SO_3$ is obviated. In the reaction zone generally defined by compartment III, there takes place the final breaking up of the carbonaceous residue with further applied heating, which residue is reduced to a granular acid-free fuel which has a high volatile content. In the zone of compartment I the temperature range may be, for example when treating a blended liquid sludge, from 212° to 300° F.; in the zone of compartment II this temperature range may be from 300° to 400° F.; while in the zone of compartment III this temperature range may be, for example, from 400° to 420° F.; these temperatures being those to which the sludge and the sludge residue are heated by the combustion gases. Entering temperatures of the combustion gases may range from 1500° to 2500° F., and I have found it particularly desirable, in order to inhibit the formation of $SO_3$ in the combustion furnace, to maintain the temperature therein above 2100° F. The temperature of the gases exiting from the gas generator A is about 240° to 260° F.

The production of an $SO_2$ gas in the gas generator A and of combustion gases containing $SO_2$ gas in the furnace substantially without the concomitant generation of $SO_3$ is of especial importance in the practice of my present invention. The operation of the gas generator is so predetermined and practiced that the $SO_2$ gas is generated substantially without any accompanying sulphuric acid or anhydride distillation and substantially without any conversion in the retort of $SO_2$ to $SO_3$. The sludge body is gradually brought up to the higher temperatures, the gradual heating being a factor in avoiding such rapid heating or local overheating as causes a distillation of $SO_3$. The avoidance of the formation of $SO_3$ at any stage of the process is very important as aforesaid, since such $SO_3$ formation results in the creation of an acid mist which is a colloidal fume and which passes through the converter and the absorber of the subsequent sulphuric acid producing apparatus. Moreover, this $SO_3$ mist acts as a "poison" for the contact mass of the catalytic converter. I have found that the avoidance of $SO_3$ distillation is the result of a combination of reasons comprising mainly first, the fact that at the gas exit end of the retort the temperatures are too low for the distillation of $SO_3$, second, the fact that the range of reacting temperatures in the retort is suitably governed, and third, the fact that the rate of bringing up the sludge to the reaction temperatures is so controlled and gradual that the formation of $SO_3$ is inhibited. If any $SO_3$ is produced either in the retort or in the furnace, it is reacted with the hydrocarbons in the retort to produce the reduction thereof to $SO_2$ so that ultimately no $SO_3$ accompanies the exit gases. In the practice of the process, the free oxygen content in the retort is restricted, and this I believe is also a factor in avoiding conversion of $SO_2$ to $SO_3$ in the retort. I have found, as aforesaid, that $H_2S$ or sulphur may be burned in part or in whole in the furnace without producing any $SO_3$ and I have found that the temperature in the furnace should be kept, as aforesaid, above 2100° F.

In the normal operation of a petroleum refinery, about 10% of the sulphuric acid used in treating the oils is unavoidably lost due to losses in gases given off, wash waters, etc. I have found that this unavoidable loss of sulphur may be made up by adding, as aforedescribed, either sulphur or a sulphur compound to the fuel; and the amount of sulphur or sulphur compound may be so regulated as to make up for any loss which may occur in the refining of petroleum, and thus provide for a balanced sulphuric acid process especially advantageous from the refineries' standpoint. In some refineries a large amount of $H_2S$ gases can be recovered by various processes, particularly from gases resulting from the cracking of petroleum oils; and this $H_2S$ gas may be desirably employed in the process. I have also found that the loss of sulphur incident to the refining process may be made up or supplied by adding an amount of sulphur to the acid sludge itself. The decomposition of the acid sludge is brought about, as I have found, by the hydrocarbons contained in the acid sludge, and particularly, I believe, by the hydrogen content of the hydrocarbons. By adding sulphur to the sludge, I am enabled to increase the sulphur content of the gases and the sulphur may also act as an added reducing agent.

The practice of the improved process and the operation of the apparatus will in the main be fully apparent from the above detailed description thereof. $SO_2$ gas is generated in the furnace B at high temperatures, and the heat of combustion thereof is utilized either in part or whole for heating the acid body or sludge in the retort A, which when heated to lower temperatures liberates $SO_2$ gas. The combustion gases obtained in the furnace B and the reaction gases obtained in the retort A are co-mingled to produce a strong $SO_2$ gas. This gas is substantially free from any $SO_3$ or other solid or vapor impurities. By using a sulphur or sulphur compound as fuel alone or mixed with other fuels, the $SO_2$ gas leaving the retort A is increased in strength not only by the direct addition of the $SO_2$ gas produced in the furnace, but also by the elimination of the $CO_2$ gas that would have been produced by the burning of other fuel. Since $H_2S$ gas may be readily obtained in the refineries, the use thereof as a fuel reduces the cost of converting the acid sludge. The process may be readily applied to other bodies capable of liberating $SO_2$, such, for example, as an aqueous solution of $SO_2$ or silica gel which contains $SO_2$ by adsorption. By the use of the process the sulphuric acid loss incident to the refining of petroleum may be replaced. The $SO_2$ gases obtained may be converted to sulphuric acid by means of the contact sulphuric acid process more particularly set forth in my copending applications Serial Nos. 568,050, filed Oct. 10, 1931, now Patent No. 1,953,225, dated April 3, 1934, and 575,549, filed November 17, 1931.

In the practice of the present invention, I prefer to restrict or limit the content of free oxygen in the combustion gases, as set forth in the last-mentioned copending application.

It will be further understood that while I prefer to embody all of the principles of the invention in the apparatus and process as described, the process may be widely varied to employ any one or a number of these principles in combination to effect any one or a number of the advantages flowing therefrom, all as I have attempted to define in the following claims.

I claim:

1. A process of producing $SO_2$ gas which consists in burning material containing sulphur or a sulphur compound as a major constituent to produce high temperature combustion gases containing $SO_2$, transferring by direct contact the heat of combustion of said gases to a combustible substance capable of liberating by chemical reduction $SO_2$ gas when heated to a point below its temperature of combustion and liberating substantially all such gas at a temperature below such combustion temperature and mingling the gaseous products of combustion with the thus liberated $SO_2$ gas.

2. The process of claim 1 wherein the temperature of the combustion gases is held above 2100° F.

3. The process of claim 1 wherein the said substance consists of an acid sludge.

4. The process of claim 1 wherein the sulphur compound is $H_2S$ gas.

5. The method of recovering $SO_2$ from a sludge body containing sulphates and carbonaceous material which consists in subjecting the sludge body to the treatment of hot gases by continuously flowing the hot gases and the sludge body into contact with each other in generally countercurrent directions, and in producing the hot gases in considerable part by the burning of sulphur or a sulphur compound.

6. A method of producing or recovering sulphur dioxide from acid sludge from the sulphuric acid treatment of carbonaceous material which consists in raising a body of the sludge slowly to reaction temperature and gradually at such a rate as to effect the optimum production of $SO_2$, by burning a material containing sulphur or sulphur compound which will produce combustion gases containing a considerable part of $SO_2$, transferring by direct contact the heat of combustion of said gases to the body of sludge to raise the same to said reaction temperature and comingling the gaseous products of combustion with the produced $SO_2$ gas.

7. The method of producing or recovering sulphur dioxide from acid sludge from the sulphuric acid purification of carbonaceous material which consists in raising a body of the sludge slowly to a reaction temperature and gradually at such a rate as to effect the optimum production of $SO_2$ substantially without any accompanying sulphuric acid or anhydride distillation in burning a material containing sulphur or a sulphur compound as a major constituent to produce $SO_2$ containing combustion gases the said combustion gases being maintained at a high temperature whereby formation of $SO_3$ is obviated, in transferring by direct contact the heat of combustion of said gases to the body of sludge to heat the same, and in comingling the gaseous products of combustion with the produced $SO_2$ gas.

INGENUIN HECHENBLEIKNER.